Patented Mar. 27, 1934

1,952,643

UNITED STATES PATENT OFFICE 1,952,643

MANUFACTURE OF TANNING PREPARATIONS

Fredrick J. Wallace, Brooklyn, N. Y., assignor to Robeson Process Company, New York, N. Y., a corporation of New Jersey No Drawing. Application September 7, 1932, Serial No. 632,085

8 Claims. (Cl. 149—4)

This invention relates to manufacture of tanning preparations; and it comprises as a new material useful in tanning a bacteria-fermented liquid containing characteristic solids of sulfite waste liquor, including the lignosulfonic acids and other acids normally contained in such liquor, and also containing in addition thereto a substantial proporton of lactic acid; said liquid being, however, substantially free of carbohydrates fermentable by bacteria and usually being a thick acid preparation of about 30° Bé.; and it further comprises a method of making such a preparation wherein sulfite waste liquor is neutralized, is then inoculated with, and fermented by, a bacterium capable of removing substantially all the reducing sugars present with production of lactic acid, the liquid being thereafter evaporated to a suitable consistency, usually from 30° to 33° Bé., and the lime precipitated as an insoluble salt, usually with sulfuric acid; all as more fully hereinafter set forth and as claimed.

Sulfite waste liquor, as produced in the "sulfite process" of the paper industry, is a liquid containing about 9.5 per cent of total solids and produced by digesting wood with a solution of an acid sulfite; usually, acid sulfite of calcium. The solids include many soluble, non-cellulosic constituents of wood and products resulting from the chemical action of the acid sulfite liquor. After the digestion step about half of the wood remains undissolved as cellulose or paper pulp, while the residue (the portion usually known as "lignin") goes into solution to form various complex organic bodies containing sulfur. As these bodies are, at least in part, of the nature of sulfonic acids united to the bases present, they are sometimes called "lignosulfonic" acids.

Sulfite waste liquor has been widely used in various industrial applications. It is employed in adhesives, as a road binder and as a tanning extract. Tanning extracts have been prepared from sulfite waste liquor by concentrating the same, usually under a vacuum, to a consistency of about 30° Bé., and acidifying for removal of the calcium content, usually by adding sulfuric or oxalic acid. These tanning preparations are widely used in the art.

Besides lignosulfonic acids, sulfite waste liquors are known to contain certain pentosans and pentoses, as well as various other sugars. These sugars, which may be grouped under the general heading, "reducing sugars", are not useful in tanning. They are "non-tans" and are mere ballast. The presence of these sugars is probably responsible, at least to some extent, for the hygroscopic properties of dried sulfite waste liquor preparations; properties useful in some, but not all, applications.

It has been proposed to recover alcohol from some of the sugars contained in sulfite waste liquor by fermenting the liquors with yeast. Yeast does not ferment all the reducing sugars present. This process has not proved commercially profitable in this country because of the extremely low concentration of alcohol obtainable. Recovery of alcohol from the fermented solutions is not economical. It might have been expected that the yeast-fermented sulfite waste liquors would produce superior tanning extracts, but this has not proved true. The yeast is capable of fermenting only a small fraction of the reducing sugars present; and it does not affect any non-sugars.

I have found that when a fermentation of sulfite waste liquor is effected with certain bacterial cultures hereinafter described, the properties of tanning liquors subsequently made from it are substantially improved. I have further found that, by means of the bacteria in question, it is possible to transform much of the carbohydrate content of sulfite waste liquor into lactic acid; some acetic acid being also sometimes produced. The transformation includes, not only the hexose sugars, but also other carbohydrates of the pentose and pentosan type. Non-useful ingredients are transformed into constituents useful in tanning. Lactic acid is useful in tanning baths, due to its so-called buffering action. It tends to maintain the pH of the bath constant. The carbohydrates from which the lactic acid is produced in my new process are not beneficial and may be detrimental. The net improvement is substantial.

Various organisms capable of producing lactic acid are available commercially. Pure cultures of these may be used in the present invention, but in all cases they require a period of acclimation or adaptation to fit them for fermenting sulfite waste liquor. All such cultures are customarily grown with hexose materials (dextrose, starches, etc.,) as carbohydrate nutriment and, in general, they are not particularly active in fermenting pentose carbohydrates. In the present invention, these organisms are grown as successive cultures in liquid media containing sulfite waste liquor as a source of carbohydrates, prior to actual use. In this cultivation, they undergo profound changes, morphological and otherwise, so that a single cell culture of the organism ready for use does not, in general, much resemble the original bacterium.

In even the purest forms of commercial cultures, I find that some individual cells are better adapted for my purposes than others. In producing organisms adapted for my purposes, I therefore generally plate or otherwise isolate individual organisms from a commercial culture of a lactic acid producing bacterium. A number of flasks containing sterile sulfite liquor are then prepared, each inoculated from an individual colony and the inoculated liquid allowed to ferment. There will always be differences between these flasks. The liquid medium may be made by dissolving a little beef peptone or other nitrogenous material in sulfite waste liquor and adding sufficient calcium carbonate to make the liquid neutral and to furnish an excess. After two or three days standing, the flasks will display individual differences; the sulfite liquor fermenting better in some than in others. Another series of flasks may be inoculated from the best flasks, but I find it often expedient to plate again from the liquid of the best flask, developing colonies originating from a single cell. The next series of flasks is inoculated from these colonies, using an individual colony for each flask. Repetitions of this operation in general give cultures energetically fermenting the pentoses and pentosans of sulfite waste liquor.

The development of suitable characteristics in the organisms may be followed by furfural determinations; the contents of a flask being distilled with hydrochloric acid and furfural determined. Furfural determinations, however, are somewhat difficult and are not particularly accurate and the stage of fermentation can usually be determined in a simpler way, by the use of Fehling's solution.

An efficient bacterium should be capable of rapidly reducing the furfural value of a sulfite waste liquor; by removing 80 per cent, or so, of the pentoses, pentosans, etc., corresponding to the furfural distilled over. An efficient bacterium should also be capable of completely removing sugars which reduce Fehling's solution. As a typical performance of an efficient bacterium, I may cite a case wherein the reducing sugar content of an unfermented sulfite waste liquor was 2 per cent and its furfural value 0.24 per cent. After fermentation with a culture derived from commercial *Lactobacillus pentoaceticus*, the resulting liquor showed only a trace of reducing sugar content, while the furfural value was reduced to 0.05 per cent.

In an extensive series of experiments, I have found that *Lactobacillus pentoaceticus* is one of the best organisms in producing cultures useful in my process. *Lactobacillus bulgaricus* and *Bacillus delbrucki* have also been found to give good results. Another lactic acid producing bacteria useful in my process is *Streptococcus lacticus*.

In practical embodiments of my process, raw sulfite liquor as received from the blow-pits is neutralized to a pH value of about 7.5 and settled to remove precipitated matter. Neutralization is usually accomplished by adding lime. The clarified liquor is run into a fermenting tank; is cooled to about 100° F. and is inoculated with a culture of lactic acid-forming bacilli. The bottom of the fermenting tank is advantageously covered with a layer of marble chips. These give slime surfaces for the bacilli to form upon and they also act as a neutralizing agent. It is desirable to add a small amount of nitrogeneous nutritive material, such as malt buds, malt sprouts, alfalfa, or ammonium chlorid. Fermentation proceeds rapidly. It may be necessary to control the pH value of the fermenting liquor from time to time, by the addition of small quantities of calcite lime or of powdered calcium carbonate, supplementing the action of the marble chips. The lactic (and acetic) acid formed combine well with the calcium present to form calcium lactate (and calcium acetate). Fermentation is usually completed within about 3 days, at the end of which, the reducing sugar content has been lowered to a negligible amount. The fermented liquor is then concentrated, usually in a vacuum. The concentrated product is then acidified, usually by means of sulfuric or oxalic acid, and filtered in order to remove the insoluble lime salts formed. The acid filtrate contains lignosulfonic acids and also the lactic acid (and acetic acid) formed in fermentation.

In one particular operation, which represents a commercial embodiment of my invention, I took 5,000 gallons of raw light liquor as received from the blow-pits. This was neutralized with sufficient calcite lime to bring the pH value to 7.5. The neutralized liquor was settled and then drawn off into a fermenting tank, the bottom of which was filled with marble chips. The liquor was cooled to 100° F. and inoculated with a culture obtained from commercial *Lactobacillus pentoaceticus*. In this particular case, the culture actually used was from a prior fermenting operation; but in the beginning, the commercial organism was acclimated as described. After inoculation of the liquor, a small amount of malt sprouts (0.4 per cent by weight on the light liquor) was added. During fermentation, the temperature was maintained at 100° F. and the pH value of the liquid was controlled, by the addition of lime, at about 7.5. After three days, the fermentation was complete. The liquor was strained to remove suspended matter and was then evaporated in vacuum to a concentration of 34° Bé. The concentrated product was acidified with diluted sulfuric acid and the calcium sulfate precipitated was removed. After removal, the remaining finished clear liquor was found to have a gravity of 30° Bé.

In routine work, portions of the fermented light liquor are employed for re-culturing a following batch. A 50 gallon portion of fermented liquor is usually sufficient to inoculate 5,000 gallons of light liquor. The marble chips are allowed to remain in the fermenting tank and can serve in inoculating a fresh batch of liquor.

In the above process, other bacilli may be employed with only slight changes in the procedure to produce optimum conditions for fementation by means of the particular bacilli used; that is, particular pH values or temperatures used in the fermentation step. Among the commercial bacilli which I have employed with success there may be mentioned *Lactobacillus delbrucki*, *Lactobacillus bulgaricus*, *Streptococcus lacticus* and *Lactobacillus pentoaceticus*. Mixed cultures of these bacilli may also be employed; or they may be used in succession. For example, a light liquor may be first inoculated with *Bacillus bulgaricus*, allowed to ferment for one day and then inoculated with *Bacillus delbrucki*.

Tanning "extracts" produced in accordance with my process have properties superior to similar products from unfermented and from yeast-fermented sulfite waste liquors. The new "extracts" can be used as general tanning agents. When used in the finishing stages in the manufacture of sole leather, in the dry dipping step for example, they produce a leather of uniform hardness, regardless of whether the operation is conducted in warm or in cold weather. The new "extracts" are capable of tanning hides to produce leather without the aid of other extracts. They may be used in the rocker, layer or yard system of a tannery. In the rocker system, they can be used until they are substantially completely exhausted. This is a new result. The finished leathers produced with my new extracts have an improved fine grain and a better color. They have a desired firmness and a good strength. The plumpness of the leather is excellent.

In order to directly compare the properties of my new tanning "extracts" with those produced from unfermented sulfite waste liquor, I give an analysis of these extracts in the following table. In the first column, there is given a typical analysis of concentrated, unfermented sulfite waste liquor (S. W. L.), while in the other columns, the corresponding results are given for the new products obtained by bacterial fermentation.

|  | Extracts from unfermented S.W.L. | Extract from S.W.L. fermented with *Lactobacillus pentoaceticus* | Extract from S.W.L. fermented with *Lactobacillus delbrucki* and *Lactobacillus bulgaricus* |
| --- | --- | --- | --- |
| Bé | 30.3° | 29.5° | 27.8° |
|  | Percent | Percent | Percent |
| Ash | 3.04 | 3.04 | 2.72 |
| Fe | .011 | .011 | .011 |
| CaO | .23 | .20 | .24 |
| MgO | 2.10 | 2.18 | 2.15 |
| Total solids | 52.13 | 50.26 | 47.20 |
| Non-tans | 25.51 | 20.96 | 19.76 |
| Tannin | 26.62 | 29.30 | 27.44 |
| Acid as acetic | 3.8 | 3.9 | 3.5 |
| Lactic acid | .00 | 7.4 | 6.6 |
| Purity | 51.00 | 58.2 | 58.1 |
| Reducing sugars | 13.45 | .25 | 1.44 |

It is seen from the above table that the content (13.45 per cent) of reducing sugars present in the unfermented concentrated sulfite waste liquor has been substantially eliminated by the fermentation step. The content of desirable ingredients has been correspondingly increased. The lactic acid content of the fermented product amounts to approximately 7 per cent. Lactic acid is a highly desirable adjunct in a tanning extract. The purity has also been substantially increased.

Various changes have been made in the above described process, without departing from the scope of my invention. The temperature and pH of the fermenting step may be altered to the optimum values for the particular bacillus employed. The concentrations of the various solutions can be varied. The magnesia content of the liquor can be eleminated, if desired, by precipitation with lime either before or after evaporation.

What I claim is:—

1. As a new tanning extract, a liquid containing the characteristic lignosulfonic and other acids of sulfite waste liquor, a substantial content of lactic acid and a negligible content of reducing sugars.

2. As a new tanning extract, a fermented liquid derived from sulfite waste liquor, containing a substantial content of lactic acid but having a negligible content of reducing sugars and a furfural value substantially less than that of the original liquor.

3. As a new tanning extract a bacteria-fermented liquid containing the characteristic lignosulfonic and other acids of sulfite waste liquor and also containing lactic acid produced during fermentation.

4. As a new tanning extract, a bacteria-fermented sulfite waste liquor concentrated to about 30° Bé. and containing lactic acid.

5. In the manufacture of tanning preparations, the step which comprises fermenting a sulfite waste liquor with lactic acid-producing bacteria.

6. In the manufacture of tanning preparations, the process which comprises inoculating a sulfite waste liquor with a lactic acid forming bacillus, allowing fermentation to take place with production of calcium lactate, concentrating the fermented liquor and removing calcium by acidification.

7. In the manufacture of tanning preparations, the process which comprises neutralizing a sulfite waste liquor, fermenting the neutralized liquor with a lactic acid-forming bacterium and controlling the fermentation in such a manner as to form lactic acid from reducing sugars contained in said sulphite waste liquor, concentrating the fermented liquor by evaporation and acidulating with sulfuric acid.

8. In the manufacture of tanning preparations from sulfite waste liquor, the process which comprises acclimating a commercial lactic acid organism by successive cultures in the presence of sulfite waste liquor and nutrients and thereafter neutralizing sulfite waste liquor fermenting the neutralized liquor with the aid of the final culture secured, concentrating the fermented liquor by evaporation and acidulating with sulfuric acid to obtain a tanning preparation containing the original linosulfonic acid and also a substantial portion of lactic acid.

FREDRICK J. WALLACE.